United States Patent

Beck et al.

[15] 3,646,425
[45] Feb. 29, 1972

[54] DC VOLTAGE MULTIPLIER

[72] Inventors: Charles H. Beck, Chalfont; William F. Meyers, Blue Bell, both of Pa.

[73] Assignee: Honeywell Inc., Minneapolis, Minn.

[22] Filed: Apr. 16, 1971

[21] Appl. No.: 134,603

[52] U.S. Cl. .................................................. 321/15
[51] Int. Cl. .................................................. H02m 7/00
[58] Field of Search .................................... 321/15

[56] References Cited

UNITED STATES PATENTS

| | | | |
|---|---|---|---|
| 3,505,586 | 4/1970 | Dulin | 321/15 |
| 3,513,376 | 5/1970 | Hajek | 321/15 |
| 3,529,231 | 9/1970 | Brown | 321/15 X |

OTHER PUBLICATIONS

Electronics, " D- C Converter Circuit Uses Capacitors," J. M. Marzolf, March, 21, 1966, pp. 97, 98.
Electronics, " Capacitors Add Up in Voltage Multiplier," H. R. Mallory, March 2, 1970, p. 104.

Primary Examiner—William M. Shoop, Jr.
Attorney—Charles J. Ungemach and Albin Medved

[57] ABSTRACT

A DC voltage multiplier having a plurality of voltage multiplying stages using transistors that are capacitively coupled to an inverter to conduct current in only one direction. A variable impedance is responsive to a signal to vary the factor of multiplication of the DC voltage multiplier between a maximum value and a lower value that is determined by the number of voltage multiplying stages affected by the variable impedance and bypassed within the multiplier by a unidirectional current conducting device.

7 Claims, 1 Drawing Figure

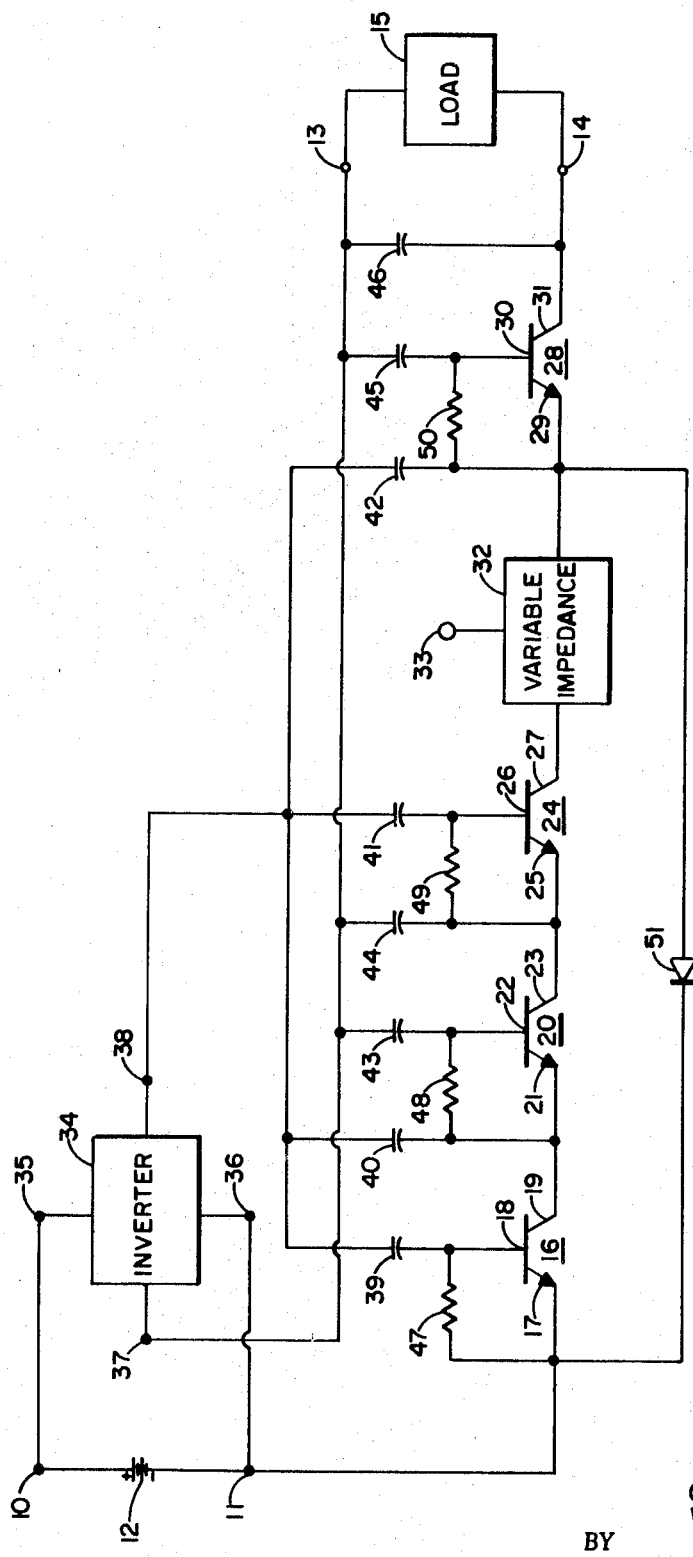

DC VOLTAGE MULTIPLIER

BACKGROUND OF THE INVENTION

The present invention is an improvement in DC voltage multiplier circuitry.

Commonly known prior art DC voltage multipliers employ a plurality of rectifier-capacitor voltage multiplying stages to increase an input voltage to a higher level. These multipliers use semiconductor diodes for the rectifiers. However, the power requirements of the diodes limit the efficiency of such multipliers. Certain applications for voltage multipliers require improved efficiency to allow the use of a very low-voltage source to supply the necessary voltage level. The invention is particularly useful in applications when, due to space and weight limitations on the voltage source, a voltage multiplier is used to enable a small DC voltage source to deliver a higher voltage. It is advantageous to have a voltage multiplier with improved efficiency to allow the use of as small a DC voltage source as is possible. The present invention provides improved efficiency over prior art voltage multipliers by reducing power losses and minimizing wasted source energy.

It is also characteristic of the prior art DC voltage multipliers that the voltage output is not widely variable in response to a control signal. In many applications wherein a voltage multiplier is used, it is necessary that the output of the voltage multiplier remain constant over a wide variation of input voltage. Since the DC voltage source is usually a small DC cell, the output voltage from the cell may vary during the operative period. It is desirable to maintain the output of the voltage multiplier at a constant level for successful operation. This is achieved by using a voltage multiplier which can vary the factor of multiplication therein over a wide range in response to a control signal indicative of the variation in the output level of the DC source.

BRIEF SUMMARY OF THE INVENTION

The present invention is an improved DC voltage multiplier wherein each voltage multiplying stage consists of a transistor and a capacitor. Each transistor receives a low-level alternating switching voltage via capacitive coupling to an inverter which cyclically inverts the polarity of the DC source across the voltage multiplier input. Each transistor becomes conductive during only one-half of each cycle of the inverter's output to conduct current in only one direction. The result is that rectification if achieved by the transistors without the high forward voltage drop characteristic of semiconductor diodes. The present invention achieves greater voltage efficiency as compared to prior art DC low input voltage multipliers.

A variable impedance that is connected in series with the voltage multiplying stages is responsive to a signal for varying its impedance which allows the voltage multiplier to vary the factor of multiplication over a wide range. The factor of multiplication is greatest when the conductivity of the variable impedance is at a maximum. The factor of voltage multiplication is reduced by decreasing the conductivity of the variable impedance until a lower limit is reached which is determined by the number of voltage multiplying stages affected by said variable impedance and bypassed by a unidirectional current conducting device.

It is an objective of the present invention to provide a low input voltage multiplier with increased efficiency.

It is a further objective of the present invention to provide a low input voltage multiplier that is responsive to a signal for varying the factor of voltage multiplication over a wide range.

BRIEF DESCRIPTION OF THE DRAWING

The sole FIGURE is a schematic drawing of a preferred embodiment of the invention.

DESCRIPTION OF THE PREFERRED EMBODIMENT

Referring to the drawing, the preferred embodiment has a pair of input terminals 10 and 11 for connection to a DC source 12 having the polarity shown. A pair of output terminals 13 and 14 are provided for connection to a load 15 which requires a DC signal.

An NPN-transistor 16 having an emitter 17, a base 18, and a collector 19 is connected to input terminal 11 via emitter 17. A second NPN-transistor 20 having an emitter 21, a base 22, and a collector 23, is connected to collector 19 via emitter 21. A third NPN-transistor 24 having an emitter 25, a base 26, and a collector 27 is connected to collector 23 via emitter 25. A fourth NPN-transistor 28 having emitter 29, a base 30, and a collector 31 is connected to output terminal 14 via collector 31.

A variable impedance 32 having a control input 33 is connected between collector 27 and emitter 29. However, as will be explained in the operation, variable impedance 32 may be located elsewhere in the circuit.

An inverter 34 having a pair of input terminals 35 and 36 and a pair of output terminals 37 and 38, is connected to input terminals 10 and 11 via input terminals 35 and 36, respectively. Inverter output terminal 38 is connected to base 18 and emitter 21 via a capacitor 39 and a capacitor 40 respectively, and also to base 26 and emitter 29 via a capacitor 41 and a capacitor 42 respectively.

Inverter output terminals 37 is connected to base 22 and emitter 25 by a capacitor 43 and a capacitor 44, and also to base 30 and collector 31 via a capacitor 45 and a capacitor 46 respectively. Inverter output terminal 37 is further connected to output terminal 13.

A resistor 47 is connected between base 18 and emitter 17, and a resistor 48 is connected between base 22 and emitter 21. Similarly, a resistor 49 is connected between base 26 and emitter 25, and a resistor 50 is connected between base 30 and emitter 29.

A diode 51 has its anode connected to emitter 29 and its cathode connected to input terminal 11.

OPERATION

The preferred embodiment of the present invention operates to produce a theoretical maximum output voltage equal to approximately four times the voltage it receives at inverter output terminals 37 and 38. The actual multiplication is somewhat lower due to the losses occurring in the circuit. Also, means are provided for varying output from a maximum value to a lower value in response to a signal.

Inverter output terminals 37 and 38 are alternately connected to the positive terminal of DC source 12 by inverter 34. When inverter output terminal 38 becomes positive, transistors 16 and 24 become conductive, and transistors 20 and 28 are nonconductive. Variable impedance 32 is fully conductive when a maximum value of output is desired. The further effects of variable impedance 32 and diode 51 upon the operation will be discussed later. With the conductivity of the transistors as stated, capacitors 40 and 42 become charged to a voltage approximately equal to the voltage of DC source 12.

When the polarity of inverter output terminals 37 and 38 reverses making inverter output terminal 37 positive, transistors 20 and 28 become conductive, and transistors 16 and 24 become nonconductive due to the charge on capacitors 39 and 41 decaying through resistors 47 and 49 respectively. Therefore, the charge on capacitors 40 and 42 cannot escape through transistors 16 and 24. Now, capacitors 44 and 46 approach a voltage equal to approximately twice the voltage of DC source 12 since capacitor 44 is connected in series with DC source 12 and capacitor 40 and capacitor 46 is connected in series with DC source 12 and capacitor 42.

Again, the polarity of inverter output terminals 37 and 38 is reversed by inverter 34 to make inverter output terminal 38 positive. Transistors 16 and 24 again become conductive, and transistors 20 and 28 become nonconductive due to the charge on capacitors 43 and 45 decaying through resistors 48 and 50, respectively. Capacitor 40 is again charged to a voltage approximately equal to the voltage of DC source 12, but capacitor 42 becomes charged to a voltage approaching three times the voltage of DC source 12, because it is connected in series with DC source 12 and capacitor 44 which was previously charged to approximately twice the voltage of DC source 12.

When inverter 34 again reverses the polarity of the input voltage to make inverter output terminal 37 positive, transistors 20 and 28 become conductive and transistors 16 and 24 become nonconductive. Capacitor 46 eventually becomes charged to a voltage of approximately four times the voltage of DC source 12 since capacitor 46 is connected in series with DC source 12 and capacitor 42 which was previously charged to a voltage of approximately three times the voltage of DC source 12. This operation is continuous to maintain a voltage of approximately four times the voltage of DC source 12 at output terminals 13 and 14.

The above description relates to the operation of the present invention when it produces a maximum value of output voltage. However, as the conductivity of variable impedance 32 is reduced, the voltage output is reduced since capacitors 42 and 46 charge less fully than when a maximum value of output is produced. Variable impedance 32 could be any apparatus, such as a transistor or a rheostat, which is responsive to some signal to vary its impedance. When variable impedance 32 becomes sufficiently nonconductive, capacitors 42 and 46 receive very little charge from capacitors 40 and 44 due to the reduced charging current flowing therefrom. Then, capacitors 42 and 46 become charged via diode 51 and inverter 34 by DC source 12. Diode 51 prevents the charge on capacitor 42 from escaping except through transistor 28 to capacitor 46. Since capacitor 42 is charged to the voltage of DC source 12, capacitor 46 is charged to twice the voltage of DC source 12 when transistor 28 becomes conductive. Therefore, a lower limit for the output voltage of the preferred embodiment of the present invention is approximately twice the voltage of the DC input voltage due to the operation of diode 51.

Of course, the number of voltage multiplying stages may be increased or decreased without altering the spirit or scope of the present invention. Also, variable impedance 32 and the anode of diode 51 may be placed anywhere in the circuit such that as variable impedance 32 becomes nonconductive, a plurality of the voltage multiplying stages are effectively removed from the circuit, and the remaining stages are allowed to continue operation by means of diode 51, thereby reducing the output of the circuit to a lower value. Transistors 16, 20, or 24 may also be utilized as the variable impedance by regulating the decay of charge from 47, 48, or 49 rather than permitting it to pass directly to 17, 21, or 25 respectively.

A number of bypassing networks comprising variable impedance-diode combinations can be employed to provide an option, whereby through operation of one or more of such bypassing networks a different number of voltage multiplying stages can be removed from the circuit. Diode 51 may also be a transistor for reduction of voltage loss.

The output of the multiplier may also be placed in series with the DC power source to provide additional voltage as in boost circuits. Dissipation of energy may be minimized by reducing the inverter frequency or pulse width for vernier variations in output voltage and removing one or more multiplying stages at a time for major ratio variations.

The embodiment disclosed in the preceding specification is preferred. The present invention is designed for low power operation which is required with a low power DC source. However, variations in the arrangement and construction of the circuit disclosed by the preceding specification such as the use of PNP-transistors may be apparent to one of ordinary skill in the art which do not depart from the nature and principle of the present invention.

We claim as our invention:

1. A DC voltage multiplier for raising the voltage level of a DC voltage source by a factor of multiplication comprising:
    input means for connection to said DC source;
    first and second output terminals;
    a plurality of transistors, each of said transistors having a control electrode and further having first and second current carrying electrodes, each of said transistors being responsive to a signal at said control electrode for conducting a unidirectional current from said first current carrying electrode to said second current carrying electrode, said transistors being connected in series between said second output terminal and said DC source for conducting a unidirectional current therebetween;
    an inverter having a first inverter output terminal and a second inverter output terminal, said inverter being connected to said DC source for causing the polarity of said DC source to cyclically reverse between said first and second inverter output terminals;
    capacitive coupling means connecting said first inverter output terminal to said control electrodes of alternate of said transistors and further connecting said second inverter output terminal to said control electrodes of the remaining of said transistors;
    means connecting said first inverter output terminal to said first output terminal;
    capacitive storage means connecting said first current carrying electrodes of said alternate of said transistors to said first inverter output terminal and further connecting said first current carrying electrodes of said remaining of said transistors to said second inverter output terminal;
    impedance means connected between said control electrode and said second current carrying electrode of each of said plurality of transistors;
    a variable impedance connected in series with said current carrying electrodes of said transistors, said variable impedance being controllable for varying the factor of multiplication from a maximum value; and
    unidirectional current conducting means connected in parallel with said variable impedance and a predetermined number of said transistors for establishing a lower limit on the variation of the factor of multiplication.

2. The DC voltage regulator of claim 1 wherein said unidirectional current conducting means comprises a diode.

3. The DC voltage regulator of claim 2 wherein said variable impedance comprises a transistor.

4. A DC voltage multiplier circuit including a DC-to-AC inverter and a plurality of multiplier stages of rectifier-capacitor combinations, wherein the factor of voltage multiplication is determined by the number of said multiplier stages actively engaged in the circuit, an improvement comprising:
    a bypassing network including a variable impedance connected in series with said multiplier stages and a unidirectional current conducting means connected in parallel with said variable impedance and at least one of said multiplier stages, said bypassing network effecting variable engagement of said multiplier stage through the control of said variable impedance, thereby allowing electronic control of the voltage multiplication of said circuit over a wide range from a maximum value to a lower value.

5. Apparatus according to claim 4 wherein said unidirectional current conducting means is connected in parallel with said variable impedance and a plurality of said multiplier stages.

6. Apparatus according to claim 4 wherein a plurality of bypassing networks are provided, each of said bypassing networks effecting variable engagement of at least one of said multiplier stages.

7. Apparatus according to claim 4 wherein said rectifier-capacitor combinations comprise transistor-capacitor combinations.

* * * * *